UNITED STATES PATENT OFFICE.

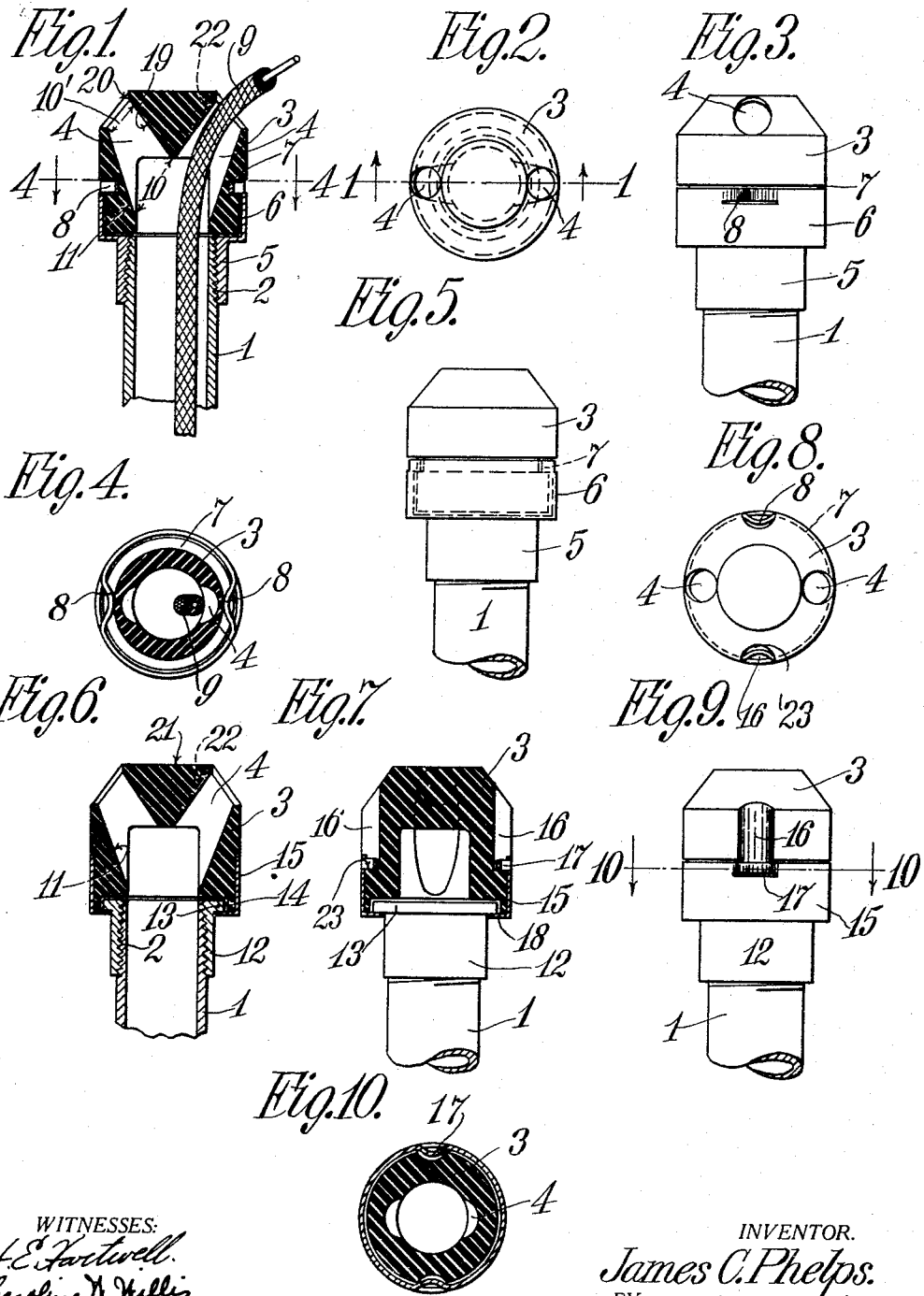

JAMES C. PHELPS, OF SPRINGFIELD, MASSACHUSETTS.

TERMINAL FITTING FOR ELECTRIC CONDUITS.

1,203,045. Specification of Letters Patent. Patented Oct. 31, 1916.

Application filed April 11, 1914. Serial No. 831,135.

*To all whom it may concern:*

Be it known that I, JAMES C. PHELPS, a citizen of the United States of America, residing in the city of Springfield, county of Hampden, and State of Massachusetts, have invented certain new and useful Improvements in Terminal Fittings for Electric Conduits, of which the following is a specification.

This invention relates to improvements in terminal fittings for electric conduits in which the end of the electric conduit is closed by means of a cap composed of insulating material and formed with a suitable number of apertures extending therethrough for receiving the electric cables.

An object of the present invention is to so construct the device that it can be readily secured to the end of the conduit or pipe without disturbing any of the fastenings or securing means for the pipe. In many places of electrical work the conduit is often securely fastened directly to the side of a wall with no room or space whatever between the conduit and wall to use any kind of an implement or tool for attaching the terminal fittings to the conduit. It is, therefore, very desirable and convenient that fittings should be attached without disturbing any of the connections, and also, without disturbing any of the wires that have been drawn through the conduit and terminal fittings.

A further object of the invention is to provide a terminal fitting in which the wires or cables can be readily pushed through the openings in the cap without seriously bending the same and with little or no effort on the part of the workman.

A further object of the invention is to provide a device that will permit the cap to be readily and cheaply molded from suitable insulating material, as porcelain, so that the fittings which are employed to attach the cap to the end of the conduit can be readily secured to the insulating material itself.

A further object of the invention is to provide a device which will include the maximum distance between the wires leading from the openings in the cap, whereby the wires will be separated from each other as much as possible in order to prevent any arcing or short circuits between the wires at these points.

Referring to the drawings: Figure 1 is a vertical sectional view through the axis of a portion of the conduit or pipe and a terminal fitting, clearly showing one of the wires in place where it enters and leaves the fitting, and as being bent only a slight distance from the axial line of the conduit, the section being on line 1—1 of Fig. 2. Fig. 2 is a top plan view of Fig. 1 but with the wires omitted, showing two outlet openings in the fitting. Fig. 3 is an external side elevation of Fig. 1, illustrating the manner of securing the insulating cap to the fitting and connecting devices between the cap of insulating material and the end of the pipe. Fig. 4 is a transverse sectional view on the line 4—4 of Fig. 1, looking in the direction of the arrows and showing the manner of rotatably securing the cap to the attaching devices. Fig. 5 is an elevational view showing in dotted lines the annular groove which is formed in the cap of insulating material and with which the coupling or attaching device engages. Figs. 6, 7, 8, 9 and 10 show a modification of the construction shown in Figs. 1 to 5 inclusive. In this modification: Fig. 6 is a vertical sectional view taken on a plane passing through the axis of the pipe and the axis of the openings in the cap, and illustrating the internally threaded collar for attaching the cap to the end of the pipe, also, the construction or manner in which the collar is secured to the cap itself. Fig. 7 is a partial vertical sectional view taken on a plane that is located at right angles to that shown in Fig. 6, and illustrating the recesses formed in the terminal to receive the attaching band, and in full lines the collar and upper end of the pipe with which the collar engages to connect the terminal cap to the pipe. Fig. 8 is a top plan view of the terminal cap, showing the recesses in the molding material and the prongs of the band entering the recesses. Fig. 9 is a side elevational view showing the recesses and the indented part or prongs engaging these recesses, and Fig. 10 is a transverse vertical sectional view taken in a plane on the line 10—10 of Fig. 9, showing one of the grooves and the indented part of the band engaging the groove.

Referring to the drawings in detail: 1 designates the upper portion of the conduit pipe having threads 2 formed thereon.

3 designates the cap proper which is usually formed or molded from some suitable insulating material, as clay, or hard rubber, through which the outlet openings 4 extend.

5 designates a coupling or collar member that is internally threaded to engage the threads 2 of the conduit 1. This member is enlarged in diameter at 6 to receive the lower end of the cap 3, as shown in Fig. 1. The cap is formed with an annular groove 7 around the side thereof, as indicated. The upper edge of the enlarged portion 6 is indented, as shown at 8, (Fig. 4) to enter and engage the groove 7 of the cap, and, at the same time to permit the coupling or collar member 5 to be rotated on the cap 3 when it is desired to attach the cap to the upper end of the conduit 1. The electric wires or cables 9 can be pushed through the conduit 1 and through the openings 4, as shown, with very little effort, for, it will be observed that the inclined openings 4 are made larger at their lower ends as indicated by means of the line designated at 10, than their outer ends at 10′. This is accomplished by making the lines which define the upper and lower portions of the openings 4 meet the axis of the conduit at different angles.

The lower side 11 of the openings 4 extend down practically flush with the inner surface of the conduit 1, as shown. This enlargement of the openings 4 at their lower side permits the wires or cables, indicated at 9, to be easily pushed or drawn through the conduit 1 without any binding or substantial bending of the cable in passing through the openings 4 of the cap. This is a very important feature of the invention as in heavy cable work it is almost an impossibility to push or draw the cables through the terminal fittings if it is necessary to bend them to any extent from the axial line of the pipe since the present construction, so far as I am aware, necessitates sharply bending of the cables as they enter and leave the caps.

Should it be desired to remove the terminal fittings for any purpose whatever it is only necessary to apply a pipe wrench or other tool to the collar 5 to rotate the same for unscrewing this collar from the conduit 1. The cap 3 can then be removed as readily understood. After the cables are drawn through the conduit and cap, it is readily seen that this cap can be drawn down tightly on to the end of the conduit by simply rotating the collar 5 and without disturbing the cables therein; the cap of course, remaining stationary while the indented prongs 8 revolve in the groove 7. It is during this rotation of the collar 5 that the cap is drawn downward on to the upper end of the conduit.

Referring to the modification shown in Figs. 6 to 10 inclusive, it will be observed that the construction of the cap 3 is slightly different. The collar 5 instead of being integral with the enlarged part 6 is made separate and adapted to rotate thereon. 12 designates the internally threaded collar which engages the screw threads 2 on the upper end of the conduit 1. This collar is formed with an annular flange 13 and enters a recess 14 that is molded in the lower end of the cap 3. 15 designates a band or ring that is permanently secured to the lower end of the insulating cap 3. This permanent attachment is made by forming recesses 16 in the sides of the cap 3. These recesses, as shown, are semi-circular in form and extend in a line parallel with the axis of the cap about one half of the length thereof. The upper edge of the band 15 is indented, as shown at 17, to engage the recesses 16. This denting of the upper edge of the band 15 by forcing the metal into the recesses 16 permanently secures the band 15 to the cap. The lower portion of the band 15 is inturned as designated at 18, and serves as a bearing or support for the annular flange 13 of the collar 12. It will be seen that this construction permits the collar 12 to be rotated independently of the band 15 and the cap 3. This is advantageous should it be found desirable to make the cap or forms other than circular, as rectangular or hexagonal in cross section, whereas, in the construction shown in Figs. 1 to 5, the groove 7 should be formed circular in shape. In Figs. 6 to 10 inclusive the external shape of the cap is important, as the flange 13 can be made to fit any shape cap whether circular or otherwise. The construction of the openings 4 in the modification shown in Figs. 6 to 10 is identical with that shown in Figs. 1 to 5. In order to attach the cap shown in Figs. 6 to 10, it is only necessary to rotate the collar 12 whereby the cap is drawn downward and threaded on to the end of the pipe without disturbing the cables that may have been drawn therethrough. In order to separate the cables 9 as widely from each other as possible to prevent arcing or short circuiting, the upper side 19 of the openings 4 is formed with portion 20 that is parallel to the axis of the cap. This construction causes the cables 9 to be located away from the axial line of the cap as it leaves a longer distance across the upper end 21 than would be the case if the side 19 extended out flush with the upper end of the cap, as indicated by the dotted line 22.

It should be observed that the grooves 16 which are located on the outer surface of the cap 3 are formed with a shoulder or abutment 23 at their lower ends, with which the indented portion 17 of the band 15 engages. This shoulder serves the purpose of tightly clamping the band 15 to the cap, for, it will be observed, that the inturned portion 18 of the band 15 engages the lower end of the cap 3, and, by making the indented portion 17 engage the shoulder 23 the result is, that the band 15 is tightly secured to the cap against any movement. It should also be observed that the grooves 16 are arranged parallel with the axis of the cap. This is a great advantage in the manufacture of the cap since it permits these grooves to be very easily formed or molded at the same time that the other parts of the cap are molded. The grooves 16 extend from the top portion of the cap downward to substantially one half of the length of the cap, and, as observed they are arranged between the openings —4—. The cap shown, only shows two openings but it is obvious that they may be formed with more than two as desired for any special use. The transverse sectional form of the grooves 16 may of course be changed as desired. It will also be observed that the outer and inner ends of the cable receiving openings 4 through the cap are of different diameters and that the lines which define the lower portion of the openings extend down to and coincide with the end and inner surface of the conduit and that the lines which define the upper portions of the openings meet in a point that is spaced from the end of the conduit, and in the axial line of the conduit whereby the cables can be pushed through the openings without materially bending the same.

What I claim is:

1. An insulating cap for closing the outlet end of a conduit in which electric wires are placed, and for permitting said wires to pass therethrough, said cap including openings extending therethrough and arranged at an angle to the axis of the cap, a protecting band attached to and surrounding the lower side and end portion of the cap, and means for attaching the band to the conduit.

2. In a device of the character described, the combination with an insulating cap having diverging openings extending therethrough and provided with external grooves therein which extend parallel with the axis of the cap and terminating in shouldered portions, a band surrounding a portion of said cap, means integral with the band and formed with an inturned flange having a dented part for engaging the shoulders at the ends of the grooves and for permanently attaching said band to the cap, and an interiorly threaded collar formed with a flange which is rotatably mounted on the flange of the band and designed for securing the cap to the threaded end of a conduit pipe.

3. In a device to close the end of an electric conduit, the combination, a cap having openings therein to receive the electric wires, a band fixedly secured to and engaging the lower end of the cap, a flange on said band and an interiorly threaded barrel provided with a flange to loosely engage the flange of the band to permit rotation of the barrel, whereby when the barrel is rotated the cap may be secured to the end of said conduit without moving or disturbing the conduit, as described.

4. The combination, in a device for closing the end of an electric conduit, of a cap having perforations therethrough, a flanged band secured to one end of the cap, and a threaded barrel rotatably held in place on the flange of the band for attaching the cap to said conduit.

5. The combination, in a device for closing the threaded end of an electric conduit, of a cap having perforations therethrough, grooves in the outer surface of the cap, each formed with a shoulder at their lower ends, a band having an inturned portion to engage the lower end of the cap and indented portions to engage the shoulders of the grooves, and a threaded barrel rotatably held in place on the cap for attaching the cap to said conduit.

6. An insulating cap for closing the end of a conduit for permitting electrical wires to pass therethrough, the outer surface of the cap having grooves extending from the top of the cap toward the bottom portion and each formed with a shoulder at its end, a band to engage the shoulders, and indented means forming a portion of the band to engage the groove and shoulder to secure the same to the conduit.

7. In a device to close the end of an electric conduit, the combination, a cap having openings therein to receive the electric wires, a coupling member fixedly secured to and engaging the lower end of the cap, a flange on said coupling member and an interiorly threaded barrel provided with a flange to loosely engage the flange of the coupling member to permit rotation of the barrel, whereby when the barrel is rotated the cap may be secured to the end of said conduit without moving or disturbing the conduit, as described.

JAMES C. PHELPS.

Witnesses:
HARRY W. BOWEN,
H. E. HARTWELL.